(12) United States Patent
Robin

(10) Patent No.: US 11,646,592 B2
(45) Date of Patent: May 9, 2023

(54) OPERATING METHOD FOR A WIRELESSLY COMMUNICATING ELECTRONIC DEVICE, AND WIRELESSLY COMMUNICATING ELECTRONIC DEVICE IMPLEMENTING SAID METHOD

(71) Applicant: SOMFY ACTIVITES SA, Cluses (FR)

(72) Inventor: Serge Robin, Thorens-Glieres (FR)

(73) Assignee: SOMFY ACTIVITES SA, Cluses (FR)

( * ) Notice: Subject to any disclaimer, the term of this patent is extended or adjusted under 35 U.S.C. 154(b) by 156 days.

(21) Appl. No.: 16/965,740

(22) PCT Filed: Jan. 29, 2019

(86) PCT No.: PCT/EP2019/052136
§ 371 (c)(1),
(2) Date: Oct. 30, 2020

(87) PCT Pub. No.: WO2019/149702
PCT Pub. Date: Aug. 8, 2019

(65) Prior Publication Data
US 2021/0057935 A1    Feb. 25, 2021

(30) Foreign Application Priority Data
Jan. 30, 2018   (FR) .................................. 1850752

(51) Int. Cl.
*H02J 50/20*   (2016.01)
*H02J 50/00*   (2016.01)
(Continued)

(52) U.S. Cl.
CPC ......... *H02J 7/0063* (2013.01); *H02J 7/00711* (2020.01); *H02J 7/007192* (2020.01);
(Continued)

(58) Field of Classification Search
CPC .......... H02J 50/001; H02J 50/20; H02J 50/80; H04W 52/0261
See application file for complete search history.

(56) References Cited

U.S. PATENT DOCUMENTS 11,310,745 B2 *   4/2022   Robin ................. H04L 12/2807
2010/0244951 A1 *   9/2010   Smith .................... H03G 3/004
                                                              330/127
(Continued)

FOREIGN PATENT DOCUMENTS

| EP | 0 621 708 | 10/1994 |
| EP | 2 978 276 | 1/2016 |
| FR | 2 758 404 | 7/1998 |

OTHER PUBLICATIONS

International Search Report for PCT/EP2019/052136, dated Mar. 28, 2019, 5 pages.
(Continued)

*Primary Examiner* — Rexford N Barnie
*Assistant Examiner* — Joseph N Inge
(74) *Attorney, Agent, or Firm* — Nixon & Vanderhye

(57) ABSTRACT

Disclosed is an operating method for a wirelessly communicating electronic device, including the following steps: a) acquisition of a radio-frequency frame representative of at least one data item intended to be transmitted by the radio-frequency transmitter in a radio-frequency message; b) determination of the amount of power available in the power storage; c) determination of the length of the radio-frequency message to be transmitted; d) determination of transmission parameters of the radio-frequency transmitter, according to the values determined for the length of the message and the amount of power available in the power storage; e) and transmission of the message by the transmitter, using the determined transmission parameters.

17 Claims, 4 Drawing Sheets

(51) Int. Cl.
   *H02J 7/00*     (2006.01)
   *H02J 7/34*     (2006.01)
   *H02J 7/35*     (2006.01)

(52) U.S. Cl.
   CPC .............. *H02J 7/345* (2013.01); *H02J 7/35* (2013.01); *H02J 50/001* (2020.01); *H02J 50/20* (2016.02)

(56) References Cited

U.S. PATENT DOCUMENTS

2012/0135696 A1*  5/2012  Lerzer .............. H04W 52/0296
                                                       455/127.1
2016/0254698 A1   9/2016  Anderson
2020/0161889 A1*  5/2020  Lan .................... H02J 50/10

OTHER PUBLICATIONS

Written Opinion of the ISA for PCT/EP2019/052136, dated Mar. 28, 2019, 6 pages.
Search Report for FR1850752, dated Aug. 22, 2018, 2 pages.

\* cited by examiner

OPERATING METHOD FOR A WIRELESSLY COMMUNICATING ELECTRONIC DEVICE, AND WIRELESSLY COMMUNICATING ELECTRONIC DEVICE IMPLEMENTING SAID METHOD

This application is the U.S. national phase of International Application No. PCT/EP2019/052136 filed 29 Jan. 2019, which designated the U.S. and claims priority to FR Patent Application No. 1850752 filed 30 Jan. 2018, the entire contents of each of which are hereby incorporated by reference.

BACKGROUND OF THE INVENTION

Field of the Invention

The present invention relates to an operating method for a wirelessly communicating electronic device. The invention also relates to a wirelessly communicating electronic device implementing this method.

The invention is applicable to the field of home automation systems, and more generally to the field of wirelessly communicating objects electrically powered by an embedded rechargeable power storage means.

Description of the Related Art

The known communicating objects are electronic devices provided with an embedded radiofrequency transmitter suitable for exchanging data with other remote devices, for example within a network of the "Internet of things" type. In order to communicate with a remote device, these objects send a radiofrequency message using their radiofrequency transmitter, which is powered by the power storage means.

These devices are typically autonomous in terms of electrical energy, that is to say, they are not connected to a power grid and depend solely on their internal power storage means to operate. This power storage means can be recharged by an energy harvesting apparatus integrated into the device.

In a known manner, energy harvesting techniques are used to generate small quantities of electricity from energy sources present in the environment. These energy sources can be vibrations or movements of a mechanical member, temperature gradients, electromagnetic rays such as radiofrequency waves, visible light or infrared light, and many other examples.

One major drawback of these known devices is that, due to the very principle of energy harvesting techniques, it is not possible to know in advance what quantity of electrical energy has been collected by the device at a given moment, and in particular before a radiofrequency message is transmitted.

For example, it is not possible to anticipate what quantity of light will be received at each moment by a photovoltaic energy harvesting apparatus, or to anticipate when or with what force a user will press a control button coupled to a piezoelectric energy harvesting apparatus.

As a result, it is not possible to guarantee that the power storage means will, at a given moment, contain a sufficient quantity of energy to allow the device to perform certain functions. In particular, there is a risk that, when the device must transmit a radiofrequency message, the power storage means will not contain enough electrical energy for the message to be able to be transmitted successfully, that is to say, for it to be able to be transmitted in its entirety. The operation of the electronic device is therefore not guaranteed under all circumstances, which is not satisfactory.

BRIEF SUMMARY OF THE INVENTION

The invention more specifically aims to address these drawbacks, by proposing a wirelessly communicating electronic device in which the energy consumption is optimized during the sending of a radiofrequency message.

To that end, the invention relates to an operating method for a wirelessly communicating electronic device, the electronic device comprising:
an electronic control circuit comprising a radiofrequency transmitter configured to transmit a radiofrequency message according to a communication protocol and
a rechargeable electrical energy reserve configured to supply electricity to the electronic device,
the operating method being implemented by the electronic control circuit and comprising the following steps:
a) acquisition, by the electronic control circuit of the electronic device, of a radiofrequency frame representative of at least one data item intended to be transmitted by the radiofrequency transmitter in a radiofrequency message;
b) determination, by the control circuit, of the amount of power available in the power storage means;
c) determination, by the control circuit, of the length of the radiofrequency message to be transmitted, the radiofrequency message comprising at least the acquired radiofrequency frame;
b) determination of transmission parameters of the radiofrequency transmitter, the determination being carried out by the control circuit according to the values determined for the length of the message and the amount of power available in the power storage means;
e) transmission of the radiofrequency message by the radiofrequency transmitter, using the determined transmission parameters.

Owing to the invention, before the sending of each message, the operating parameters of the radiofrequency transmitter are adapted automatically as a function of the energy available in the power storage means.

According to advantageous but optional aspects of the invention, such a process may incorporate one or more of the following features, considered alone or according to any technically allowable combination:

During step b), the determination of the available amount of energy is made from the measured values of the amount of energy supplied to the power storage means by an energy harvesting apparatus of the electronic device over time and from measured values of the amount of electrical energy supplied by the power storage means to the device over time.

During step b), the determination of the amount of available energy is estimated:
b1) by measuring, with no load, a first electrical property representative of the available amount of energy of the power storage means, preferably a first voltage across the terminals of the power storage means;
b2) by measuring a second electrical property representative of the available amount of energy of the power storage means, preferably a second voltage across the terminals of the power storage means, this measurement being done after withdrawing a predefined amount of energy from the power storage means;

b3) and computing the value of the amount of energy available in the power storage means from the first and second measured values.

The method comprises, during step b), measuring the temperature within the electronic device, using a temperature measurement apparatus, and correcting the amount of energy available in the power storage means based on the measured temperature.

Step d) comprises selecting a specific operating point among a set of predefined operating points of the transmitter stored in a computer memory of the control circuit, the set of predefined operating points defining correspondence rules creating a relationship between the predefined operating points and, on the one hand, values or ranges of values of the message lengths, and on the other hand, values or ranges of values of the amount of energy available in the power storage means, and wherein the specific operating point is selected by identifying, within the set, the predefined operating point corresponding to the determined values of the message length and the available amount of energy.

Step d) further comprises determining an operating class of the radiofrequency transmitter.

Step d) further comprises determining the energy necessary for the radiofrequency transmitter in order to transmit a radiofrequency message having the determined length with a predetermined radiated energy.

The transmission parameters comprise the operating class and the operating point of the transmitter and wherein step d) comprises a sub-step for optimizing the operating classes and an operating point of the transmitter based on the determined values of the length of the message and of the amount of energy available in the power storage means.

According to another aspect, the invention also relates to a wirelessly communicating electronic device comprising an electronic control circuit comprising a radiofrequency transmitter configured to transmit a radiofrequency message according to a communication protocol and a rechargeable electrical energy reserve configured to supply electricity to the electronic device. The control circuit is programmed to carry out the operating method as previously described.

According to advantageous but optional aspects of the invention, such an electronic device may also incorporate one or more of the following features, considered alone or according to any technically allowable combination:

The device further comprises an energy harvesting apparatus intended to recharge the power storage means electrically, and the control circuit is programmed to carry out the operating method as previously described.

The electronic device further comprises a temperature measuring apparatus intended to measure the temperature inside the device, and the control circuit is programmed in order, during step b), to correct the value of the determined amount of available energy based on the measured temperature.

BRIEF DESCRIPTION OF THE DRAWINGS

The invention will be better understood, and other advantages thereof will appear more clearly, in light of the following description of one embodiment of a method and electronic device provided solely as an example and done in reference to the appended drawings, in which.

DETAILED DESCRIPTION OF THE PREFERRED EMBODIMENTS

Figure 1:
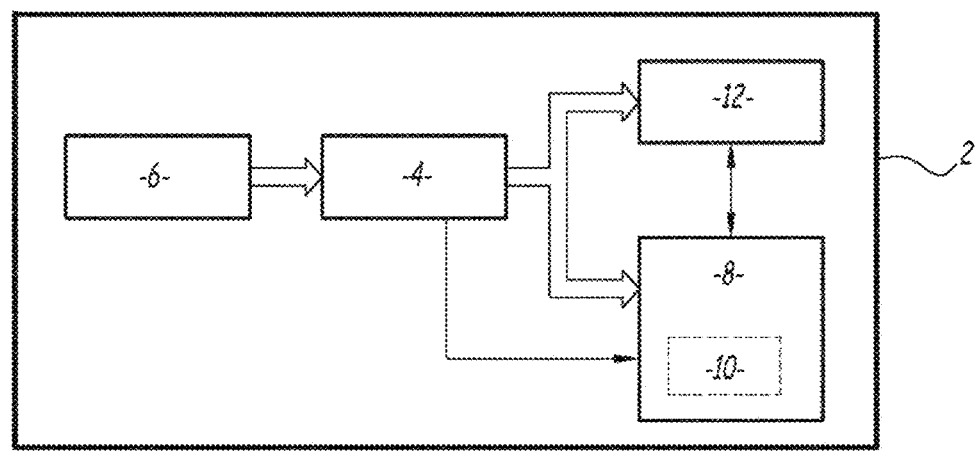
FIG. 1 is a schematic illustration of a wirelessly communicating electronic device according to the invention.

FIG. 1 shows a wirelessly communicating electronic device 2, suitable for exchanging data over a radiofrequency link with a remote receiver according to a communication protocol. The device 2 is for example intended to be part of a network of communicating objects of the "Internet of things" type. In this example, the device 2 is usable within a home automation system, such as a building management system or an alarm system, and can thus communicate by a radiofrequency link with other electronic devices of the network, or even with a central server.

The device 2 comprises a rechargeable electrical energy reserve 4, an energy harvesting apparatus 6 and an electronic control circuit 8 comprising a radiofrequency transmitter 10. Reference "12" refers to a subassembly of the device 2 making it possible to implement a main function of the device 2. For example, the subassembly 12 is connected to the control circuit 8.

Advantageously, the device 2 comprises a protective housing, inside which the control circuit 8, the power storage means 4, and at least part of the energy harvesting apparatus 6 and the subassembly 12 are housed.

According to embodiments of the invention, the device 2 is a device for measuring one or several physical properties, for example an environmental physical property such as a temperature, a humidity level, a brightness, a sunshine level, an atmospheric pressure and/or a concentration of at least one chemical element. The device 2 can alternatively be a human presence detector, or a fire detector. In these embodiments, the subassembly 12 comprises a sensor suitable for delivering a signal representative of the corresponding physical property or properties.

According to other embodiments, the electronic device 2 is a control point, intended to receive instructions from a user, then to resend these instructions to another device of the network, for example to a control unit. According to one variant embodiment, the control point resends the instructions from the user to an actuator such as a concealing apparatus, a lighting apparatus or any other home automation apparatus.

In these embodiments, the subassembly 12 comprises an interface for acquiring at least one command, or man-machine interface, comprising one or several selection elements such as a button and/or a scroll wheel, or a touch-sensitive screen, or any other actionable control member.

The power storage means 4, also called "energy reserve," serves to store the electrical energy necessary for the operation of the device 2. The power storage means 4 is also configured to supply electricity to the electronic device 2, and in particular the electrical control circuit 8. For example, the device 2 is autonomous, that is to say, it works without necessarily being connected to an electrical distribution grid.

According to a first example, the power storage means 4 is a battery of rechargeable electric cells, for example using lithium-ion technology, or lithium-polymer technology, or metal nickel-hydride technology, or nickel-cadmium technology, or any other appropriate technology.

According to a second example, the power storage means 4 comprises one or several capacitors, or a battery of supercapacitors.

In general, the power storage means 4 is a physicochemical storage element.

The power storage means 4 here is embedded in the device 2. For example, the power storage means 4 has a storage capacity less than or equal to 10 Watt·hour.

The power storage means 4 is electrically connected to the control circuit 8 in order to supply the latter with electrical energy. According to embodiments, when necessary, the power storage means 4 is also connected to the subassembly 12, so as to supply it with electrical energy.

The energy harvesting apparatus 6 is configured to supply electricity to the power storage means 4, in order to recharge it, from energy collected in the environment of the device 2.

For example, the energy harvesting apparatus 6 is configured to collect electrical energy from solar rays, electromagnetic rays, temperature gradients, vibrations or movements of a mechanical member, or a combination of several ambient energy sources.

Thus, according to one example, the energy harvesting apparatus 6 comprises a photovoltaic solar panel. According to another example, the apparatus 6 comprises a turbine associated with a wind turbine. According to still another example, the apparatus 6 comprises an electromechanical element, for example a piezoelectric module, configured to convert movements of a mechanical member of the device 2, and in particular of the subassembly 12, into electricity.

According to one particular and non-limiting embodiment, if the subassembly 12 comprises an acquisition interface provided with one or several mechanically actionable selection elements, then the energy harvesting apparatus 6 can advantageously comprise a piezoelectric element mechanically coupled to one or several selection elements of the acquisition interface. In this way, the actuation of a selection element by a user causes a movement that is converted, by the piezoelectric element, into a small amount of electrical energy able to recharge the power storage means 4.

Figure 2:
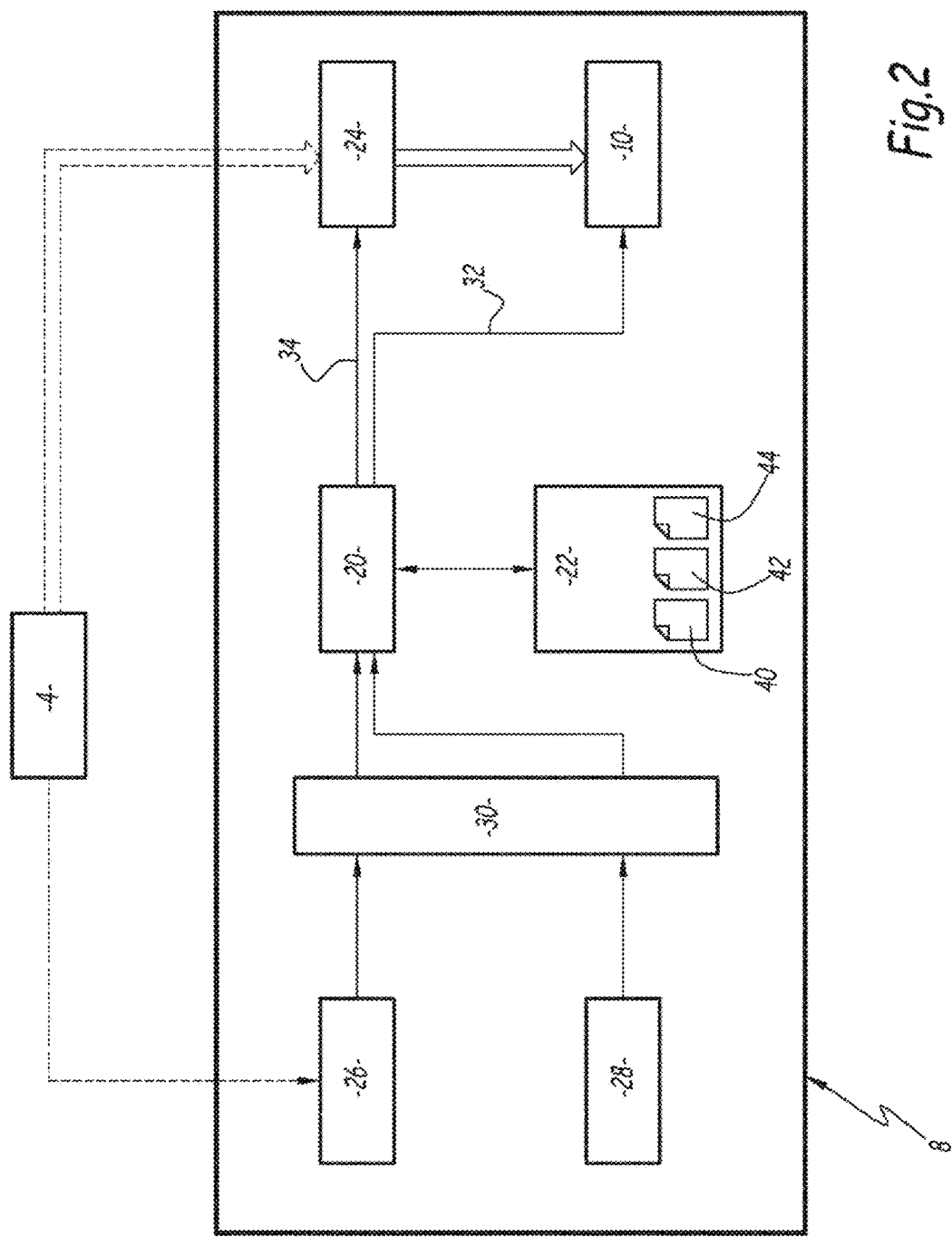
FIG. 2 is a block diagram of an electronic control circuit of the electronic device of FIG. 1.

FIG. 2 shows an exemplary embodiment of the control circuit 8. In this example, the arrows with a double line symbolize power connections and the arrows with a single line symbolize data exchange connections.

The control circuit 8 here comprises the radiofrequency transmitter 10, a programmable electronic computing unit 20, a computer memory 22, an electrical supply circuit 24 and an apparatus 26 configured to determine the amount of energy available in the power storage means 4. Optionally, the electronic circuit 8 can also comprise an apparatus 28 for measuring the temperature inside the device 2.

The measuring apparatus 26 is suitable for delivering a signal representative of at least one electrical property relative to the power storage means 4, and more specifically an electrical property representative of the electrical power delivered by the power storage means 4. For example, the electrical property is the voltage across the terminals of the power storage means 4. The measuring apparatus 26 then comprises at least one voltage sensor configured to deliver a signal representative of the voltage across the terminals of the power storage means 4 and/or a sensor configured to deliver a signal representative of the current circulating between the power storage means 4 and a charge electrically connected to at least one terminal of the power storage means 4. The operation of the measuring apparatus 26 is disclosed hereinafter.

The apparatus 28 for measuring the temperature comprises at least one temperature sensor, such as a thermocouple or a negative or positive temperature coefficient sensor, for example placed inside the device 2, preferably near or in contact with the power storage means 4. In a variant, the temperature measuring apparatus 28 can be omitted.

The control circuit 8 here comprises an acquisition interface 30, suitable for collecting measurement signals delivered by the measuring apparatuses 26, 28 and for relaying the corresponding data item to the computing unit 20. For example, the acquisition interface 30 comprises an analog-digital converter.

According to embodiments, the control circuit 8 is an integrated circuit of the system-on-chip type. In a variant, the circuit 8 is an electronic board provided with printed circuits on a dielectric substrate and on which the components of the control circuit 8 are mounted.

The computing unit 20 serves to automatically control the operation of the control circuit 8. For example, the computing unit 20 is a programmable microcontroller, or a microprocessor, preferably with low electricity consumption. According to one embodiment, the acquisition interface 30 is integrated into the computing unit 20.

The computing unit 20 is in particular programmed to control the sending of a radiofrequency message to a remote receiver belonging to the communication network. To that end, the unit 20 is programmed to acquire a radiofrequency frame representative of at least one data item intended to be transmitted according to a communication protocol by the radiofrequency transmitter 10 of the electronic device 2. For example, the radiofrequency frame is generated by the subassembly 12, and is representative of a received command and/or of at least one environmental physical property. The radiofrequency frame can also be representative of an alarm message and/or of a diagnostic relative to the internal state of the electronic device 2.

The computing unit 20 is also programmed to generate a radiofrequency message comprising at least the acquired radiofrequency frame. According to one embodiment, the radiofrequency message can comprise a repetition of the acquired radiofrequency frame for redundancy purposes. Advantageously, the repetition of the radiofrequency frame makes it possible to increase the likelihood that at least one frame will be received by the recipient receiver.

According to one embodiment, when the message comprises a repetition of identical frames, the successive frames are spaced apart from one another by a pause of predetermined length.

In the description, the length of a radiofrequency frame, a radiofrequency message or a pause is considered to be equivalent to the transmission duration respectively of the radiofrequency frame, the radiofrequency message or the pause, for simplification purposes.

The generated radiofrequency message can be transmitted by the radiofrequency transmitter 10 at the initiative of the computing unit 20, or in response to a request received from another device of the network. For example, when a radiofrequency message is generated, the computing unit 20 performs encoding and/or modulation operations of the informational content of the radiofrequency frame, according to a predefined communication protocol.

The computing unit 20 is also programmed to control the operation of the radiofrequency transmitter 10 and the supply circuit 24 in order to ensure the transmission of the message wirelessly, that is to say, using radiofrequency waves. To that end, the unit 20 is connected to the transmitter 10 by a data link 32 and to a regulating interface of the supply circuit 24 by a data link 34.

The memory 22 here is a non-volatile memory, for example comprising one or several memory modules using Flash technology, or EEPROM technology, or a magnetic memory, or a phase-change memory, or any other appropriate information storage technology. For example, the memory 22 forms a permanent and computer-readable information storage medium.

Figure 3:
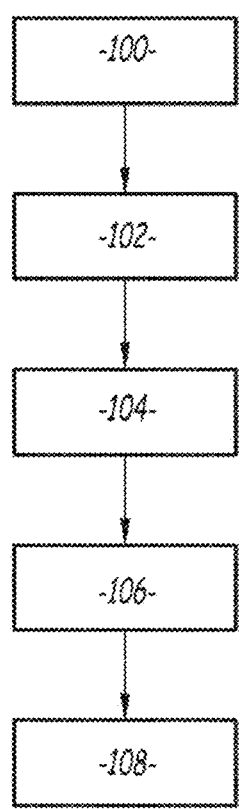
FIG. 3 is a flowchart of an operating method of a wirelessly communicating electronic device according to the invention and intended to be carried out by the device of FIG. 1.

The memory 22 contains embedded software and/or executable instructions 40 intended to be executed by the unit 20 and order to ensure the operation of the electronic control circuit 8, and in particular to control the sending of a radiofrequency message and to carry out an operating method of a wirelessly communicating electronic device 2, in particular that described in reference to FIG. 3.

The memory 22 also contains data 42 and a numerical value 44, the role of which is described in more detail hereinafter.

The supply circuit 24 is in particular suitable for supplying electricity to the radiofrequency transmitter 10 according to a particular operating point. The supply circuit 24 is in turn supplied by the power storage means 4. For example, the supply circuit 24 comprises a power converter, particularly of the DC-DC type, and advantageously comprises a voltage regulator, such as a linear regulator, electrically connected at the output of the power converter. As an illustrative example, the radiofrequency transmitter 10 can be supplied with an input supply voltage inclusively between 0.9 volts and 3.7 volts.

For example, the power converter of the supply circuit 24 is selectively switchable between several operating modes. As an example, the power converter can operate either as a buck or step-down converter or as a boost or step-up converter. The converter can also operate, in each of these operating modes, with an adjustable voltage deviation. The voltage deviation here refers to the amplitude with which the output voltage is increased, or on the contrary, decreased relative to the input voltage of the converter. The switching and the voltage deviation here are controlled by the computing unit 20.

The transmitter 10 is for example a radiofrequency interface able to serve as radiofrequency transmitter, or transceiver, although here, only the transmission function is described in detail. The transmitter 10 here in particular comprises a radiofrequency transmission module, a radiofrequency antenna and a power amplifier, which are not illustrated. The amplifier is polarized by the supply circuit 24 according to a particular operating point. The input of the power amplifier is electrically connected to the output of the transmission module and the output of the power amplifier is electrically connected to the antenna. The amplifier is configured to amplify the output signal of the transmission module and to supply the radiofrequency antenna.

For example, the transmitter 10 is suitable for operating according to a radiofrequency communication protocol of the LoRa® type, or of the Zigbee® type, or of the WiFi type, or of the Bluetooth® Low Energy type, or any other appropriate radiofrequency communication protocol.

The control circuit 8, and more specifically the computing unit 20, is programmed to optimize the energy consumption of the electronic device 2 during the transmission of a radiofrequency message by the transmitter 10 as a function of the amount of energy available in the power storage means 4. The control circuit 8 is for example programmed to carry out the operating method described in reference to FIG. 3, in order to prevent the transmission of the message from being truncated or interrupted due to a lack of sufficient energy in the power storage means 4.

In practice, in this example, the amount of energy consumed by the control circuit 8, and in particular by the transmitter 10, in order to transmit a radiofrequency message with length Lt is denoted "Ec" and is given by the following theoretical formula:

$$E_c = P_s \times L_t = P_r \times \frac{1}{R_{conv}} \times \frac{1}{R_{RF}} \times L_t \qquad (1)$$

In this formula, "Ps" designates the electrical power supplied by the power storage means 4 to the supply circuit 24, "Pr" is the power radiated (also called transmission power) by the antenna of the transmitter 10, "$R_{conv}$" is the energy efficiency of the supply circuit 24, "$R_{RF}$" is the energy efficiency of the amplifier of the transmitter 10. The efficiency $R_{RF}$ is defined as the ratio of the power Pe supplied at the output by the supply circuit 24 to the amplifier by the power Pr radiated by the antenna. The efficiency $R_{conv}$ is defined as the ratio of the power supplied to the circuit 24 by the power storage means 4 by the power Pe supplied as output by the circuit 24. The power Pe supplied as output by the supply circuit 24 corresponds to the power consumed by the transmitter 8 and in particular by the power amplifier.

When the radiofrequency message is formed by the repetition of several identical frames of equal length L, the quantity Lt in the above frame is replaced by the product N×L, where "N" designates the number of frames with length L.

The length of the message thus determined corresponds to the duration during which the transmitter 10 transmits the radiofrequency signal corresponding to the message and therefore the duration during which the transmitter 10 consumes electrical energy.

It will therefore be understood that the consumed energy can be modified by acting on operating parameters of the different elements of the circuit 8 that are involved in the sending of the message, and more specifically on operating parameters of the supply circuit 24 and the transmitter 10. These parameters are collectively called "transmission parameters" hereinafter.

In a known manner, the transmission parameters in particular comprise the voltages and currents that are necessary to polarize the power amplifier. These parameters in particular condition the transmission power Pr of the transmitter 10 during the transmission of the radiofrequency message. The transmission power Pr in particular depends on the electric supply current and the electric supply voltage supplied by the supply circuit 24 from the power storage means 4.

Another parameter influencing the energy consumption is the operating class of the amplifier of the transmitter. For example, the operating class of the amplifier directly affects its energy efficiency $R_{RF}$. In a known manner, the operation of a power amplifier within a radiofrequency transmitter can be characterized by a so-called conduction angle value. The amplifiers can thus be ranked in several classes depending on the value of this conduction angle, such as class A, class AB, class B, class C, class D or class E. Each class has a corresponding value or range of values of the conduction angle. These classes are sequenced relative to one another such that the corresponding conduction angle value decreases from class A to class E. As previously stated, the energy efficiency of the power amplifier depends on its operating class; the energy efficiency $R_{RF}$ increases from class A to class E.

The energy efficiency $R_{conv}$ of the supply circuit 24 depends on the operating modes of the DC-DC power converter, in particular depending on whether the converter is working as step-down converter or step-up converter. The energy efficiency $R_{conv}$ of the supply circuit 24 also depends on the value of the voltage deviation between the output voltage and the input voltage of the converter. For example, the energy efficiency decreases if the voltage deviation increases, and vice versa. The efficiency $R_{conv}$ here is inclusively within a range from 60% to 95%.

The number N of frames transmitted depends on the structure of the radiofrequency message. It is frequent for a message to comprise identical frames repeated one after the other intended to be transmitted in succession. This redundancy serves to increase the likelihood of the informational content of the message being correctly received by its recipient if part of the transmitted message is lost. In this example, to simplify the explanation, it is considered here that the message comprises only one frame with length L.

In the illustrated example, it is considered that the transmission parameters that may be modified during the optimization comprise all of the parameters set out above, although in practice only some of these transmission parameters may be considered.

Generally, the optimization of the value of the energy Ec here consists of selecting transmission parameters of the transmitter, and more specifically of selecting a set of specific values of each of the transmission parameters, for which the value of the consumed energy Ec is lowered below a certain value. In a variant, the optimization can also consist of minimizing a function representative of the consumed energy Ec. It may involve a function depending on the energy Ec given by the theoretical formula above and also depending on the temperature of the electronic device 2.

For example, hereinafter, for the transmission parameters, a distinction is made between, on the one hand, the transmission class of the amplifier and on the other hand the "operating point" of the transmitter 10, the operating point corresponding to the voltages and currents necessary to polarize the power amplifier of the transmitter 10.

One exemplary embodiment of the operating method of a wirelessly communicating electronic device is now described in reference to FIG. 3. Advantageously, this method allows the dynamic management of the transmission power of a radiofrequency message by a wirelessly communicating electronic device.

First, during a step 100, a radiofrequency frame representative of at least one data item intended to be transmitted by the radiofrequency transmitter 10 according to a communication protocol is acquired by the computing unit 20.

Next, during a step 102, the amount of energy available in the power storage means 4 is determined automatically. The amount of energy available in the power storage means 4 corresponds to the amount of energy able to be delivered by the latter to the electronic device 2, and in particular to the control circuit 8. Step 102 for determining the amount of energy available is carried out by the control circuit 8, for example using the computing unit 20 and the measuring apparatus 26. The determination of the available energy can be made in different ways.

According to a first embodiment, the circuit 8 determines, during the operation of the device 2, continuously or at repeated intervals, the amount of energy supplied by the apparatus 6 for harvesting energy for the power storage means 4. The circuit 8 also determines, continuously or at repeated intervals, the amount of energy supplied, over time, by the power storage means 4 to the different elements of the electronic device 2. To that end, the electronic device 2 may comprise an electrical measurement apparatus connected between the energy harvesting apparatus 6 and the power storage means 4 suitable for measuring the energy entering the power storage means. This may for example be a current sensor or a voltage sensor.

In other words, the circuit 8 monitors the amounts of energy that enter and leave the power storage means 4, so as to obtain an energy balance for the power storage means 4. These determinations here are done using the measuring apparatus 26, by measuring at least one electrical property, preferably by measuring the voltage across the terminals of the power storage means 4 and the currents circulating at the input and the output of the power storage means 4. The corresponding available energy is next computed automatically, knowing the properties of the power storage means 4, for example the equivalent resistance. The computation can be done by the computing unit 20 using a program stored in the memory 22. Likewise, the properties of the power storage means can be stored in the memory 22.

From a known initial available energy value at an initial moment in the power storage means 4, it is thus possible to know, at each subsequent moment, the amount of energy available in the power storage means 4. For example, this amount of available energy is recorded in the memory 22 as a numerical value 44. This numerical value 44 is updated by the computing unit 20 all throughout the operation of the device 2, either continuously, or at predefined time intervals, or each time the power storage means 4 is stressed to be recharged or to withdraw energy.

Thus, in order to determine the amount of energy available in the power storage means, during step 122, the unit 20 automatically reads the numerical value 44 previously recorded in the memory 22.

In a variant, the amounts of energy entering and leaving the power storage means 4 are recorded separately in the memory 22 and the computation of the available energy in the power storage means 4 is only done during step 102.

Figure 4:
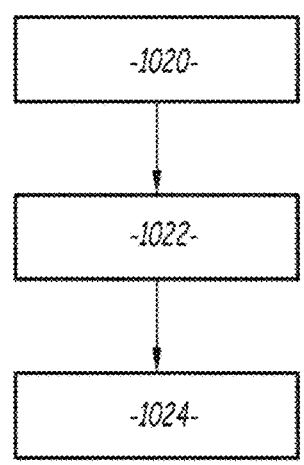
FIG. 4 is a flowchart outlining one step of the method of FIG. 3 according to one of the embodiments of the invention.

According to a second embodiment of step 102, the determination of the amount of available energy is estimated or extrapolated by taking several measurements of an electrical property of the power storage means 4 using the measuring apparatus 26. One example of such a method is illustrated in FIG. 4 and here comprises operations, or sub-steps, numbered 1020 to 1024. This example is described in reference to a voltage across the terminals of the power storage means 4, but in a variant, other electrical properties relative to the power storage means 4 can be used, such as the current.

Thus, during the operation 1020, the no-load voltage across the terminals of the power storage means 4 is measured, using the measuring apparatus 26. A first voltage value is thus obtained.

"No-load" here means that the measurement of the voltage across the terminals of the power storage means 4 is done while no electric charge is connected at the output of the power storage means 4, that is to say, no electric current is withdrawn by the power storage means 4. A first voltage value is thus obtained. To that end, the electronic device 2 can comprise a switching circuit electrically connected to the output of the power storage means 4. The switching circuit is configured to switch the output of the power storage means either to the charge, during operation, or to the measuring apparatus 26 during a no-load measurement. The switching of the switching circuit is controlled by a processor, like that of the computing unit 20. In reference to FIG. 1, the load corresponds to the control circuit 8 and the subassembly 12.

Next, during the operation 1022, a predefined amount of energy is withdrawn in the power storage means 4, for example, by withdrawing a predefined amount of current δ1 for a predefined duration δt. To that end, as previously stated, the electronic device 2 can comprise a switching circuit electrically connected to the output of the power storage means 4. The switching circuit is configured to switch the output of the power storage means 4 to an electric charge with predetermined characteristics for the duration δt, so as to subtract the amount of current δ1. This results in a voltage drop across the terminals of the power storage means 4. A measurement of the voltage across the terminals of the power storage means 4 is done, for example, using the measuring apparatus 26, so as to obtain a second voltage value related to the current discharge. The duration θt and current δ1 values are preferably chosen based on the storage technology used for the power storage means 4. The value of the duration δt and current withdrawal is chosen to be as short as possible so as to avoid taking too large an amount of current δ1 and thus to avoid discharging too much of the power storage means 4. The aim being to compute a slope, the withdrawal duration δt must be chosen so as to be able to perform the computation. It therefore also depends on the measuring apparatus, and in particular the quantum of the analog-digital converter of the acquisition interface 30.

Then, during the operation 1024, an estimate of the energy available in the power storage means 4 is done from the first and second measured voltage values and using a predefined formula, which for example depends on the nature of the power storage means 4. According to one embodiment, the estimate is done by the computing unit 20 using executable instructions for example stored in the memory 22.

This second embodiment is advantageously used in the presence of an energy harvesting apparatus 6 supplying energy to the power storage means 4 in the form of a short pulse, as is in particular the case for energy harvesting devices based on piezoelectric elements. Indeed, such energy harvesting apparatuses 6 supply a significant voltage in a very short length of time. As a result, the first embodiment does not always yield satisfactory results, since it is difficult to precisely measure the amount of energy supplied by the apparatus 6 to the power storage means 4 when this quantity of energy is supplied in the form of a short pulse, for example lasting less than 100 μs.

Thus, at the end of the determining step 102, irrespective of the estimating mode used, one has a value representative of the amount of energy available in the power storage means 4. The amount of energy available is denoted "Er" hereinafter.

Advantageously, during step 102, the determined amount of available energy Er is automatically corrected as a function of the temperature value measured by the apparatus 28. Indeed, in practice, the performance of the apparatus 6 and/or the power storage means 4 can depend on their temperature. This is in particular the case for piezoelectric elements and capacitors. For example, during the determining step 102, a measurement of the ambient temperature within the electronic device 2 is done, by the temperature measuring apparatus 28 and, at the end of the determination of the amount of available energy, a correction is done by applying a correction coefficient to the determined amount of energy Er. The correction coefficient depends on the measured temperature value. The correction is done from a predefined correction law and/or a precalculated table of values. The predefined correction law and/or the pre-calculated table of values can be stored in the memory 22.

This correction based on the temperature is advantageously applicable to both embodiments of step 102 previously described. In the first embodiment, the temperature correction can be done during each of the measurements over time and not only when step 102 is performed.

In a variant, no temperature correction is done and the measuring apparatus 28 can be omitted.

Next, during a step 104, the control circuit 8 automatically determines the length of the radiofrequency message to be transmitted, that is to say, it chooses to build, from the acquired radiofrequency frame, a longer or shorter radiofrequency message based on the circumstances.

The radiofrequency message also comprises at least the radiofrequency frame acquired during step 100.

According to one embodiment, the radiofrequency message only comprises the acquired radiofrequency frame.

Figure 6:
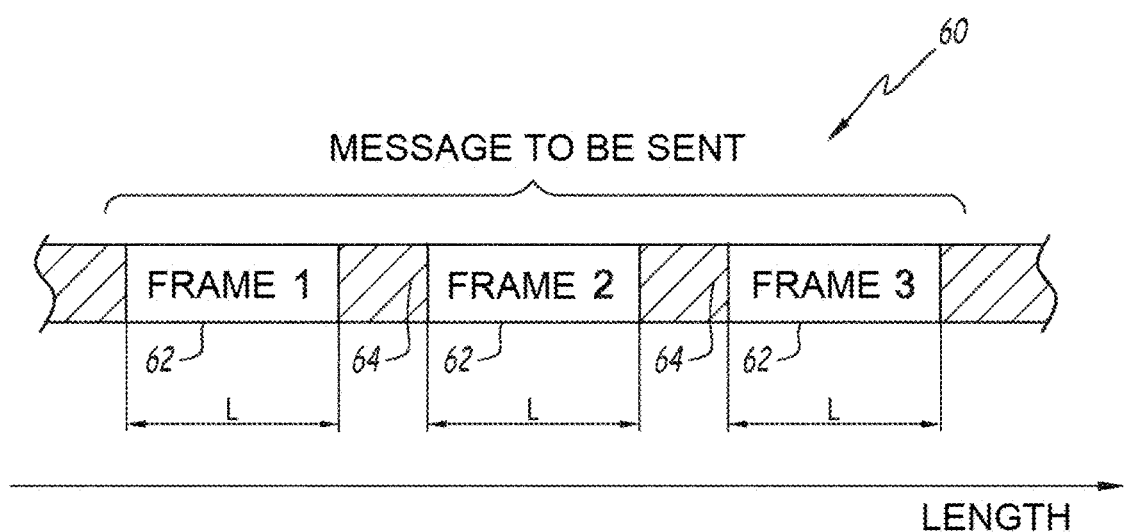
FIG. 6 is a schematic illustration of a message to be transmitted by the electronic device of FIG. 1 according to certain embodiments of the invention.

According to an alternative embodiment, the message is made up of a repetition of the frame acquired for redundancy purposes. Optionally, the successive frames can be separated by a pause of predetermined length. By way of illustration, FIG. 6 shows an example of a radiofrequency message 60 formed by three identical radiofrequency frames 62 each having a same length L, the three successive frames 62 being spaced apart from one another by a pause 64 of predetermined length LP.

Figure 7:
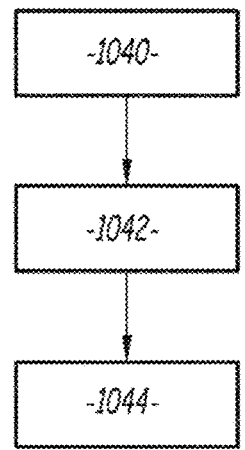
FIGS. 7 and 8 are flowcharts each outlining a step of the method of FIG. 3 according to one of the embodiments of the invention.

In reference to FIG. 7, step 104 for determining the length of the radiofrequency message intended to be transmitted can comprise several sub-steps referenced 1040 to 1044.

During a sub-step 1040, the control circuit 8 and in particular the computing unit 20 begins by determining the length L of the radiofrequency frame acquired during step 100.

Step 104 comprises a sub-step 1042 during which the computing unit 20 composes the radiofrequency message intended to be transmitted by the transmitter 10.

The composition of the radiofrequency message, namely the number of repetitions of the radiofrequency frame 60 acquired in the message, can depend on a predetermined criterion relative to the use of the electronic device 2, in particular relative to the theoretical range of the radiofrequency message 60.

For example, when the electronic device 2 is intended to transmit a message 60 with a short range, it is preferable to favor the number of frames relative to the radiated power. The message therefore comprises a high number of frames 62. This therefore results, for a given amount of available energy, in reducing the transmission power (also called radiated power) of the transmitter relative to the case where the message 60 comprises only one frame 62. "Short range" refers to a range of less than about 5 m. In the case of an application in the home automation field, this may correspond to a range on the order of one room of a building. This scenario may, for example, correspond to a control point configured to send instructions to an actuator, such as a concealing apparatus or a lighting apparatus located near the control point, in the same room.

In the case of a short-range radiofrequency communication, the causes for non-reception of messages 60 by the recipient are primarily due to periodic interference. It is therefore preferable to repeat the frames 62 so that, if such periodic interference occurs, at least one complete frame 62 nevertheless has a high likelihood of being received by the recipient. Decreasing the value of the transmission power is, in this specific case, less detrimental, as long as the recipient is not too far away.

The case of a long-range communication will now be considered. "Long-range" refers to a range greater than 5 m, typically, a range up to about 20 m, or even 30 m. In the context of an application to the field of home automation, this represents a range making it possible to encompass all of the rooms of the house, or even a range up to the doorway or the outer fence of the house. In the case of a long-range radiofrequency communication, the causes for non-reception of the radiofrequency message 60 by the recipient receiver are particularly due to a lack of radiated power. It is therefore preferable to favor the transmission power to the detriment of the number of repeated frames. The computing unit 20 therefore prefers to concentrate maximal power on a smaller number of frames rather than to transmit a large number of frames 62 with an insufficient power. This would result in discharging the power storage means 4 more quickly without being able to guarantee that the recipient will receive the message 60 correctly.

In other words, in this scenario, the computing unit 20 composes a message 60 only comprising a single frame 62. The message may comprise two frames 62.

Of course, other intermediate scenarios between these two extremes are conceivable.

According to one embodiment, the electronic device 2 is configured, when it is manufactured, to transmit according to a short range or a long range. The computing unit 20 is therefore programmed to favor the number of frames over the power or vice versa, depending on the scenario. In practice, the appropriate program, executable by the computing unit 20, is stored in the memory 22 depending on the scenario.

According to an alternative embodiment, the electronic device can be "generic" and able either to transmit at short range or at long range. To that end, the device can comprise a switch programmed to configure the type of transmission of the control unit 8 and in particular of the transmitter 10, either according to a short range or according to a long range.

According to another embodiment, the electronic device 2 can comprise particular ergonomics to switch the transmission to a short range or a long range. The particular ergonomics can for example correspond to a particular action on one or several selector elements.

Step 104 comprises a sub-step 1044 during which the computing unit 20 determines the length of the radiofrequency message 60. The length Lt of the message intended to be transmitted can be deduced by multiplication of the length of the acquired frame by the number of repetitions of the frame.

Next, during a step 106, the unit 20 chooses the transmission parameters of the radiofrequency transmitter 10. The transmission parameters essentially comprise the operating point of the transmitter 10 and the operating class of the power amplifier. The transmission parameters are determined such that the theoretical amount of energy Ec that will be consumed by the control circuit 8 during the transmission of the message is less than the determined amount of energy Er available in the power storage means 4. When possible, the unit 20 determines transmission parameters so as to minimize the amount of energy that will be consumed during the transmission of the message.

The computing unit 20 determines the operating class of the amplifier as a function of its architecture and the desired radiated power. The operating class is determined so as to avoid the problems of distortion of the radiofrequency signals.

As an example, the computing unit 20 cannot systematically use classes D to B, even though they have good efficiencies, since in this case, the distortion of the signals causes a radiofrequency normative nonconformity due to overly high harmonics. As a function of the radiated power, the computing unit 20 chooses the most appropriate operating class for the harmonics to stay below the threshold imposed by the radiofrequency standards. For example, at high power, the computing unit 20 will approach class A or AB, whereas at low power, the created harmonics being lower, an operating class B, C, D or even E may be suitable.

According to another embodiment, the determination of the operating class of the transmitter may be done as a function of the radiated power using a match table between the radiated power and the operating class to be used, as described in more detail hereinafter.

The operating point of the transmitter is next determined as a function of the determined operating class. According to one particularity of the invention, the operating point of the transmitter is not determined so as to optimize the operation of the amplifier, but so as to optimize the use of the available energy in order to transmit a radiofrequency message according to the desired conditions.

According to one preferred embodiment, the operating point is selected by the unit 20 among a set of predefined operating points, here stored in the memory 22. For example, the data 42 stored in the memory comprise such a set of predefined operating points, among which the unit 20 can choose a particular operating point, as a function of the values of the amount of available energy Er and the length L of the message intended to be transmitted that are determined during the preceding steps.

For example, the set 42 defines match rules that create a relationship between the predefined operating points and, on the one hand, values or ranges of values of the message lengths and, on the other hand, values or ranges of values of the amount of energy available in the power storage means 4. In other words, in order to select a particular operating point, the unit 20 identifies, in the set 42, the predefined operating point that corresponds to the value of the amount Er of available energy determined during step 102 and also corresponding to the length L of the message determined at the end of step 104.

This set 42 of predefined operating points is for example computed beforehand by the manufacturer of the electronic device 2, then stored in the plant in the memory 22 during manufacturing thereof. These predefined operating points are preferably computed as a function of the characteristics of the different components of the circuit 8, such as the technology used for the energy harvesting apparatus 6, the storage technology used for the power storage means 4, or even also properties of the supply circuit 24 and the transmitter 10.

Owing to the set 42 of predefined operating points, the computing unit 20 does not need to perform optimization or minimization computations of the theoretical amount of consumed energy Ec, which is advantageous because such computations require significant computing resources and may require a fairly long computation time. The selection of a particular operating point among the set 42 of predefined operating points requires fewer computing resources and less computing time than a complete optimization computation done "on the fly" and in real time.

Figure 5:
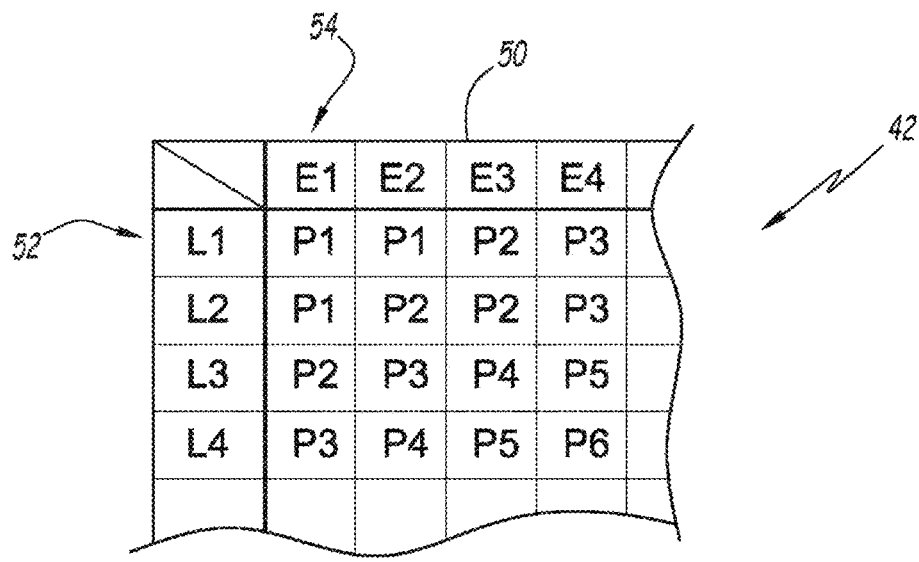
FIG. 5 is a schematic illustration of a table of values making it possible to choose transmission power values during certain embodiments of the method of FIG. 3.

FIG. 5 shows an illustrative example of one such set 42 of predefined operating points. Here, this set 42 is a two-dimensional table 50 or matrix. However, in a variant, other data structures can be used, such as a database.

The table 50 comprises rows 52 and columns 54. References E1, E2, E3 and E4 index the columns 54 and correspond to ranges of values that the available energy value Er estimated during step 102 may assume. References L1, L2, L3 and L4 index the rows 52 and designate ranges of message lengths. References P1, P2, P3, P4, P5 and P6 designate the predefined operating points associated with the intersections of rows and columns. Thus, an operating point here is associated with each pair of ranges of available energy values and ranges of message lengths.

For example, each operating point P1, P2, P3, P4, P5 and P6 stored in the table 50 is a list of values of the different considered operating parameters. In a variant, each operating point P1, P2, P3, P4, P5 and P6 contained in the table 50 is a pointer that designates an area of the memory 22 in which the values of the different considered operating parameters are stored, in the form of a list or any other appropriate digital data structure.

The rows 52 and columns 54 here are indexed by value ranges, but in a variant, they can be indexed by discrete values, or by any appropriate combination of discrete values and ranges.

In this example, in order to select a particular operating point, the computing unit 20 automatically looks for the range E1, E2, E3 or E4 corresponding to the estimated available energy value Er, and looks for the range L1, L2, L3 and L4 corresponding to the estimated length of the message. The selected particular operating point is that which is associated with the two ranges thus identified. For example, if the available energy value Er belongs to the range E2 and the value of the length L belongs to the range L3, then the corresponding particular operating point is the point P3. The particular operating point in particular corresponds to the voltages and currents to be applied to the radiofrequency transmitter 10, and in particular to the power amplifier, in order to allow the transmission, with the power maximum, of a radiofrequency message having the estimated length in light of the estimated available amount of energy.

According to one embodiment, step 106 for determining transmission parameters can comprise a sub-step for optimizing the choice of the operating class and the operating point of the transmitter. The optimization can be done by the computing unit using a suitable executable program stored in the memory 22.

According to other embodiments, the particular operating point is determined by the computing unit 20 by performing a computation to minimize the theoretical amount of consumed energy Ec previously defined, without using the set 42. The set 42 can then be omitted.

For example, the unit 20 is programmed to carry out minimization computing operations of a function with one or several variables, for example using a digital resolution or optimization model stored in the memory 22. In order to determine appropriate transmission parameters, in particular to select an appropriate operating point, the values of the transmission parameters are optimized until a combination is found for which the theoretical consumed energy value Ec is less than the available energy value Er, or even the combination for which the value Ec is as small as possible. In other words, the unit 20 computes the set of transmission parameters that make it possible to obtain a consumed energy quantity that is less than the estimated available energy quantity Er.

Advantageously, the optimization computation is carried out by using constraints defined as a function of the technology used for the energy harvesting apparatus 6 and/or the energy storage technology used for the power storage means 4. These constraints make it possible to restrict the values that some of the transmission parameters can assume, which makes it possible to simplify the optimization computation. These constraints are for example predefined by the manufacturer of the electronic device 2 and are advantageously recorded in the memory 22.

As an example, these constraints are summarized in the table below when the power storage means 4 comprise capacitors or supercapacitors.

| Energy harvesting technology | Optimized parameter | Power converter | Amplifier class |
| --- | --- | --- | --- |
| Piezoelectric element | Current | Step-down with high voltage deviation | Class B or even C |
| Photovoltaic module with cells in series | Current | Step-down with high voltage deviation | Class AB or B |
| Photovoltaic module with cells in parallel | Voltage | Step-up with low voltage deviation | Class AB or B or even C |
| RF wave collection | Voltage | Step-up with medium to high voltage deviation | Class AB or B or even C |

The table indicates, for each energy harvesting technology used to recharge the power storage means 4 (first column from the left), the values that must be assumed by the parameters relative to the operating mode of the power converter (third column), the values that the parameters relative to the amplifier of the transmitter 10 may assume, and in particular its operating class (last column) and the supply current or voltage value, which may vary in order to optimize the power value Pe consumed by the transmitter 10 (second column), with the understanding that the other voltage or current value assumes a value that is imposed by the technology used for the apparatus 6 in conjunction with the power storage means 4. As an illustration, in this table, the "small voltage deviation," "high voltage deviation" and "medium voltage deviation" parameters respectively refer to a voltage deviation less than about 1 V, a voltage deviation greater than about 3 V and a voltage deviation inclusively between these two values.

Advantageously, the optimization is done taking the temperature value measured by the measuring apparatus 28 into account. However, this is not essential and can be omitted when the measuring apparatus 28 is in turn omitted.

Thus, at the end of step 106, the computing unit 20 has values of the transmission parameters of the radiofrequency transmitter guaranteeing a transmission of the entire radiofrequency message with the energy available in the power storage means 4.

Then, during a step 108, the message is transmitted by the transmitter 10 using the values of the transmission parameters of the radiofrequency transmitter previously determined.

For example, in reference to FIG. 2, the unit 20 sends the transmitter 10, via the connection 32, the message ready to be transmitted. The computing unit 20, and in particular its microcontroller, controls the supply circuit 24, here via the connection 34, so that it supplies to the transmitter 10, and in particular the power amplifier, the voltages and currents necessary to polarize the amplifier around the determined operating point. Thus supplied, the transmitter consumes a power Pe whose value is defined by the determined operating point. The unit 20 can also control the supply circuit 24 so that the power converter and/or the voltage regulator operates in the operating mode and with the voltage deviation defined by the determined operating point. The unit 20 also controls the transmitter 10 so that the amplifier operates with the conduction angle, and therefore with the determined operating class.

Thus, before the transmission of each radiofrequency message, the transmission parameters of the radiofrequency transmitter are adapted automatically as a function of the energy available in the power storage means when the message is transmitted.

Thus, because over time the length of the message intended to be transmitted can vary and the amount of available energy is never identical, each message is transmitted with different transmission parameters.

It will therefore be understood that the invention makes it possible to prevent the transmission of the message from being truncated or interrupted because not enough available energy remains in the power storage means 4.

Additionally, the invention is relatively simple to implement, in particular in terms of robustness, ease of production on an industrial scale and cost. Indeed, in light of constraints related to compactness and miniaturization, low energy consumption, and unit cost incumbent upon the device 2, it is not always possible to equip the power storage means 4 with a regulating and monitoring apparatus of the "battery management system" type as would be found on the battery assemblies of certain technologies, since such monitoring devices are too complex and too expensive in light of how the device 2 will be used.

A first advantageous exemplary embodiment of the steps for determining 104 the length of the radiofrequency message 60 and determining 106 the transmission parameters is described in the case of a long-range transmission.

The computing unit determines, during a sub-step 1040, the length of the acquired radiofrequency frame 60 then, during a sub-step 1042, composes a radiofrequency message 60 comprising only one radiofrequency frame 62. In this scenario, the length LT of the message is equal to the length L of the radiofrequency frame 62.

Next, during step 106, the control unit 8, and in particular the range unit 20, determines the transmission parameters of the radiofrequency transmitter 10.

The transmission being long range, power is given precedence over the number of frames. The computing unit 20 therefore chooses an operating class among classes A or AB for example based on the type of recharging apparatus 6.

Once the operating class is determined, the computing unit looks in the memory 22 for the table 50 comprising the set 42 of predefined operating points. Based on the amount of available energy and the length LT of the message 60 intended to be transmitted, the computing unit selects the operating point to be applied as previously described.

If no operating point satisfies the two criteria of available energy and message length, the computing length cannot select an operating point and therefore cannot configure the supply circuit. As a result, no radiofrequency message 60 is transmitted.

According to one embodiment, when no message 60 is transmitted, the computing unit commands the transmission of a warning signal to the user. The warning signal is any signal, as long as it is perceived by the user and it allows the user to understand that no radiofrequency message 60 can be transmitted due to insufficient electrical energy available in the power storage means 4. The signal can, for example, be a signal transmitted by an element inside the electronic device 2. The warning signal can be a lighted signal, for example, the blinking or illumination for a predetermined time of a light source, such as a light-emitting diode or a lighted indicator, located on the electrical device. It can also be a sound signal emitted by a low-energy sound apparatus, such as a piezoelectric sound apparatus.

A second example of the steps for determining 104 the length of the radiofrequency message 60 and determining 106 the transmission parameters is now described in the case of a short-range transmission.

The computing unit determines, during a sub-step 1040, the length of the acquired radiofrequency frame 60.

In this example, the range being short, the radiofrequency message 60 must comprise several successive frames 62. According to a first embodiment, in the case of a long-range transmission, the radiofrequency message comprises a predetermined number $N_{max}$ of radiofrequency frames. As an example, $N_{max}$ equals 3 or 5.

During sub-step 1042, the computing unit therefore composes a message 60 comprising $N_{max}$ successive frames 62, and optionally $N_{max}-1$ pauses 64 each separating two consecutive frames, then determines the length of the message 60.

During step 106, the computing unit 20 determines the transmission parameters of the radiofrequency transmitter 10.

The transmission being short range, the number of frames is given precedence relative to the transmission power. The power being low, the computing unit 20 therefore chooses one operating class among the classes having a high efficiency, such as classes C to D for example as a function of the type of recharging apparatus 6 present in the electronic device 2.

Once the operating class has been determined, the computing unit calls the table 50 comprising the set 42 of predefined operating points stored in the memory 22.

The computing unit 20 goes through said table 50 in order to determine whether an operating point corresponding to the energy available in the power storage means and the length of the radiofrequency message 60 to be transmitted exists. If the computing unit finds such an operating point, it selects it and configures the supply circuit to polarize the amplifier according to this operating point. If the computing unit does not find any point corresponding to the available energy and the determined message length, it decrements the number of frames $N_{max}$ contained in the message 60 by one unit.

If the value of $N_{max}$ is greater than or equal to 1, the computing unit 20 looks again in the table 50 for whether an operating point corresponding to the available energy and the determined message length exists. The computing unit 20 reiterates this operation until it finds an operating point satisfying both the available energy and message length criteria.

As previously stated, if an operating point of the table 50 corresponds to the amount of available energy and the message length in question, the computing unit 20 selects it and configures the supply circuit to polarize the amplifier according to this operating point. Otherwise, no message is transmitted.

According to one embodiment, when no operating point has been found in the table and therefore no radiofrequency message 60 has been transmitted, the computing unit 20 commands the transmission of a warning signal to the user.

Another exemplary embodiment of the operating point will now be described.

During a step 100, the computing unit 20 acquires a radiofrequency frame representative of at least one data item intended to be transmitted by the radiofrequency transmitter 10 according to a communication protocol. According to one embodiment, the radiofrequency frame can be sent by the subassembly of the device 2 through a data exchange link.

Next, during a step 104, the control circuit 8, and in particular the computing unit 20, automatically determines the length of the radiofrequency message to be transmitted.

Step 104 for determining the length of the radiofrequency message can comprise sub-steps 1040 to 1044 similar to those previously described.

During a sub-step 1040, the computing unit determines the length L of the acquired frame.

Next, during a sub-step 1042, the computing unit 20 composes the radiofrequency message intended to be transmitted by the transmitter 10. As stated in the embodiment previously described, the composition of the message depends on the desired transmission range. When the message is intended to be transmitted with a long range, the radiofrequency message comprises only the acquired radiofrequency frame. When the message is intended to be transmitted with a short range, the radiofrequency message comprises a predetermined number $N_{max}$ of times the acquired radiofrequency frame, Nmax being a non-nil integer. Optionally, each successive frame is separated by a pause of predetermined length. As an example, Nmax can be equal to 3.

Lastly, during a sub-step 1044, the computing unit 20 determines the length Lt of the radiofrequency message 60. The length Lt of the message intended to be transmitted can be deduced by multiplication of the length L of the acquired frame.

During a step 102, the computing unit determines the amount of energy available in the power storage means. The determination 102 of the amount of available energy can be done as previously described.

According to another embodiment, the determination 102 of the amount of energy can be done using a program executable by the computing unit recorded in the memory 22.

The program can for example implement the following mathematical formula:

$$Er=((V_0-ESR*Ic)-Vmin)*Ic*Lt \quad (2)$$

Wherein:

Er represents the amount of available energy;

$V_0$ represents the no-load voltage of the power storage means;

ESR represents the equivalent series resistance of the power storage means;

Ic represents the measurement current;

Vmin represents the minimum operating voltage of the transmitter during transmission, that is to say, the minimum voltage making it possible to operate the transmitter;

Lt represents the length of the transmitted radiofrequency message.

The value of the equivalent series resistance, also called internal resistance, of the power storage means 4 can be stored in the memory 22 and called by the computing unit. In order to account for the aging of the power storage means 4 and therefore the evolution of the value of the equivalent series resistance, the value of the equivalent series resistance can be recomputed periodically in order to update the value recorded in the memory 22.

To that end, the electronic device 2 can comprise a switching circuit electrically connected to the output of the power storage means 4 and configured to switch the output of the power storage means either to the control unit or to a measuring circuit. The switching circuit can be connected to the microcontroller of the computing unit in order to control the switching and acquire the equivalent series resistance of the power storage means periodically. The period of the update of the equivalent series resistance is for example 1 month or 2 months.

In order to determine the measuring current Ic, the switching circuit can for example be configured to switch the output of the power storage means 4 to a current sensor. As an illustration, the current sensor can be a shunt connected to the ground. A measuring apparatus is connected in parallel across the terminals of the shunt and is configured to deliver a voltage proportional to the value of the current passing through the shunt.

This determining method based on knowing the equivalent series resistance can be used generally during step 102, independently of the particular embodiment of the operating method described here.

Figure 8:
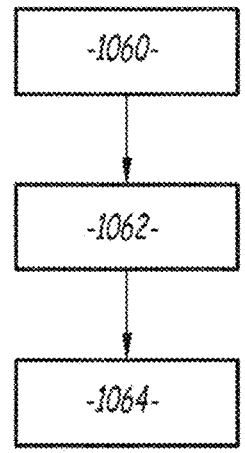

Next, during a step 106, the unit 20 determines the transmission parameters of the radiofrequency transmitter 10. The determining step 106 of the transmission parameters of the radiofrequency transmitter 10 can comprise sub-steps 1060 to 1064, as illustrated in FIG. 8.

During a sub-step 1060, the computing unit determines the energy necessary for the radiofrequency transmitter to transmit a radiofrequency message having the determined length Lt with a predetermined radiated energy.

According to a first embodiment, the computing unit considers a predetermined radiated energy value Emax, for example, by reading the corresponding value Emax in the memory 22. From the value of the radiated energy, the computing unit 20 determines the energy necessary for the transmitter 10 to radiate such energy. To that end, the computing unit can use an executable program stored in the memory 22.

The program can for example implement the theoretical mathematical formula (1) previously defined.

The computing unit 20 next compares the determined necessary energy to the available amount of energy. If the available amount of energy is strictly greater than the necessary energy, the computing unit selects the radiated energy value. The computing unit can for example record the selected value in the memory 22. If the available amount of energy is less than the necessary energy, the computing unit decrements the value of the radiated power by a predetermined amount Qe, then it reiterates the computations until it finds a radiated power value that is strictly less than the available amount of energy.

According to a second, alternative embodiment, the computing unit 20 can fill in a value table. A first column of this value table corresponds to the values assumed by the radiated energy between two extreme values, for example from a maximum value Emax to a minimum value Emin with a decrement equal to a predetermined amount Qe. The extreme energy values Emax and Emin, as well as optionally the value of the increment, can be recorded in the memory 22. A second column of this value table corresponds to the values assumed by the necessary energy. For each row, the computing unit determines the energy necessary for the radiofrequency transmitter 10 to transmit a radiofrequency message having the determined length Lt with the radiated energy value for the same row. The computing unit next travels the second column in order to find the maximum necessary energy value strictly less than the amount of available energy in the power storage means. Once the necessary energy value has been found, the computing unit selects the corresponding radiated energy value. The computing unit can for example record the selected value in the memory 22.

As an illustration, the maximum Emax and minimum Emin energy values can respectively be equal to 25 mW and 1 mW. The predetermined amount Qe can for example be equal to 1 mW. According to another example, Emax=15 dBm, Emin=0 dBm and Qe=1 dB.

Once the radiated power is selected, the computing unit determines the operating class of the radiofrequency transmitter 10, and in particular the power amplifier, during a sub-step 1062.

According to one embodiment, a value table is recorded in the memory 22. The table comprises, in a first column, value ranges of the radiated power, and a second column comprising a list of operating classes, for example from class A to class E. Each radiated power value range has a corresponding operating class. The value table thus creates a relationship between a radiated power and an operating class of the transmitter 10. During sub-step 1062, the computing unit calls the value table creating the relationship between the radiated power values and the operating classes. The computing unit 20 travels the value ranges of the column corresponding to the radiated power in order to find out which value range the selected radiated power value is in. The computing unit next determines the operating class of the transmitter by reading the operating class corresponding to the located range.

Lastly, during a sub-step 1064, the computing unit determines the operating point of the transmitter 10 as previously stated. Preferably, the determination 1064 of the operating point is made from a table 50 comprising a set 42 of predefined operating points, for example, stored in the memory 22.

The operating method next comprises a step 108 for transmitting the radiofrequency message 60 with the determined transmission parameters of the radiofrequency transmitter 10.

Although the invention has been described in relation to an electronic device 2 powered by a rechargeable power storage means, other embodiments and other modes of implementation can be considered with an electronic device powered by a non-rechargeable power storage means, such as one or several batteries. To that end, the electronic device 2 can comprise a power meter.

The embodiments, modes of implementation and variants considered above may be combined to create new embodiments.

The invention claimed is:

1. An operating method for reducing energy consumption when sending a radiofrequency message by a wirelessly communicating electronic device including an electronic control circuit and a rechargeable electrical power storage, the electronic control circuit having a radiofrequency transmitter configured to transmit a radiofrequency message according to a communication protocol, the rechargeable electrical power storage being configured to supply electricity to the electronic device, the operating method being implemented by the electronic control circuit and comprising:
    acquiring, by the electronic control circuit of the electronic device, a radiofrequency frame representative of at least one data item to be transmitted by the radiofrequency transmitter in a radiofrequency message;
    determining, by the electronic control circuit, an amount of power available in the power storage;
    determining, by the electronic control circuit, the length of the radiofrequency message to be transmitted, the radiofrequency message comprising at least the acquired radiofrequency frame;
    determining transmission parameters of the radiofrequency transmitter, the transmission parameters comprising an operating class of a power amplifier of the radiofrequency transmitter, the operating class being one of a plurality of operating classes, each of the operating classes having a corresponding conductive angle value or a corresponding range of conduction angle values, an energy efficiency of the power amplifier being directly affected by the operating class of the power amplifier, the determining the transmission parameters being carried out by the electronic control circuit according to the values determined for the length of the radiofrequency message and the amount of power available in the power storage; and
    transmitting the radiofrequency message by the radiofrequency transmitter, using the determined transmission parameters.

2. The method according to claim 1, wherein, during the determining the amount of power available, an available amount of energy is determined from the measured values of the amount of energy supplied to the power storage by an energy harvesting apparatus of the electronic device over time and from measured values of the amount of electrical energy supplied by the power storage to the electronic device over time.

3. The method according to claim 1, further comprising, during the determining the amount of power, estimating the amount of available energy by:
    measuring, with no load, a first electrical property representative of the available amount of energy of the power storage,
    measuring a second electrical property representative of the available amount of energy of the power storage after withdrawing a predefined amount of energy from the power storage, and
    computing the value of the amount of energy available in the power storage from the first and second measured values.

4. The method according to claim 3, further comprising, during the determining the amount of power, measuring the temperature within the electronic device, using a temperature measurement apparatus, and correcting the amount of energy available in the power storage based on the measured temperature.

5. The method according to claim 1, wherein the determining the transmission parameters comprises selecting a specific operating point among a set of predefined operating points of the radiofrequency transmitter stored in a computer memory of the control circuit, the set of predefined operating points defining correspondence rules creating a relationship between the predefined operating points, values or ranges of values of the message lengths, and values or ranges of values of the amount of energy available in the power storage, and wherein the specific operating point is selected by identifying, within the set of predefined operating points, the specific operating point corresponding to the determined values of the message length and the available amount of energy.

6. The method according to claim 1, wherein the determining the transmission parameters comprises determining the energy necessary for the radiofrequency transmitter to transmit the radiofrequency message having the determined length with a predetermined radiated energy.

7. The method according to claim 6, wherein the transmission parameters comprise the operating class and an operating point of the radiofrequency transmitter, and wherein the determining the transmission parameters further comprises optimizing the operating classes and an operating point of the radiofrequency transmitter based on the determined values of the length of the message and the amount of energy available in the power storage.

8. A wirelessly communicating electronic device comprising:

the electronic control circuit comprising the radiofrequency transmitter configured to transmit the radiofrequency message according to a communication protocol, the electronic control circuit being programmed to carry out the operating method according to claim 1; and the rechargeable electrical power storage configured to supply electricity to the electronic device.

9. The electronic device according to claim 8, further comprising an energy harvesting apparatus configured to electrically recharge the power storage, wherein the available amount of energy is determined from (i) the measured values of the amount of energy supplied to the power storage by the energy harvesting apparatus of the electronic device over time and (ii) measured values of the amount of electrical energy supplied by the power storage to the electronic device over time.

10. The electronic device according to claim 8, further comprising a temperature measuring apparatus configured to measure the temperature inside the electronic device, and wherein the control circuit is programmed, during the determining the amount of power, to correct the value of the determined amount of available energy based on the measured temperature.

11. The method according to claim 2, wherein the determining the transmission parameters comprises selecting a specific operating point among a set of predefined operating points of the radiofrequency transmitter stored in a computer memory of the control circuit, the set of predefined operating points defining correspondence rules creating a relationship between the predefined operating points, values or ranges of values of the message lengths, and values or ranges of values of the amount of energy available in the power storage, and wherein the specific operating point is selected by identifying, within the set of predefined operating points, the specific operating point corresponding to the determined values of the message length and the available amount of energy.

12. The method according to claim 3, wherein the determining the transmission parameters comprises selecting a specific operating point among a set of predefined operating points of the radiofrequency transmitter stored in a computer memory of the control circuit, the set of predefined operating points defining correspondence rules creating a relationship between the predefined operating points, values or ranges of values of the message lengths, and values or ranges of values of the amount of energy available in the power storage, and wherein the specific operating point is selected by identifying, within the set of predefined operating points, the specific operating point corresponding to the determined values of the message length and the available amount of energy.

13. The method according to claim 4, wherein the determining the transmission parameters comprises selecting a specific operating point among a set of predefined operating points of the radiofrequency transmitter stored in a computer memory of the control circuit, the set of predefined operating points defining correspondence rules creating a relationship between the predefined operating points, values or ranges of values of the message lengths, and values or ranges of values of the amount of energy available in the power storage, and wherein the specific operating point is selected by identifying, within the set of predefined operating points, the specific operating point corresponding to the determined values of the message length and the available amount of energy.

14. The method according to claim 3, wherein the first electrical property is a first voltage across the terminals of the power storage.

15. The method according to claim 14, wherein the second electrical property is a second voltage across the terminals of the power storage.

16. The method according to claim 1, wherein the transmission parameters of the radiofrequency transmitter comprise an operating point of the power amplifier of the radiofrequency transmitter, the operating point corresponding to voltage and currents necessary to polarize the power amplifier.

17. The method according to claim 1, wherein determining the length of the radiofrequency message comprises defining a number of times the acquired radiofrequency frame is to be repeated in the radiofrequency message to be sent, wherein the method further comprises acquiring a desired theoretical emission range of the wireless device, and wherein the length of the radiofrequency message and the operating class of the power amplifier are automatically determined as a function of the desired emission range.

* * * * *